UNITED STATES PATENT OFFICE.

BYRAMJI D. SAKLATWALLA, OF BRIDGEVILLE, PENNSYLVANIA, ASSIGNOR TO THE AMERICAN VANADIUM CO., OF PITTSBURGH, PENNSYLVANIA, A CORPORATION OF NEW JERSEY.

PROCESS FOR RECOVERY OF VANADIUM.

1,020,224.     Specification of Letters Patent.     Patented Mar. 12, 1912.

No Drawing.     Application filed December 22, 1910. Serial No. 598,817.

*To all whom it may concern:*

Be it known that I, BYRAMJI D. SAKLATWALLA, of Bridgeville, in the county of Allegheny and State of Pennsylvania, have invented certain new and useful Improvements in Processes for Recovery of Vanadium; and I do hereby declare the following to be a full, clear, and exact description of the invention, such as will enable others skilled in the art to which it appertains to make and use the same.

This invention relates to the extraction of vanadium from material containing the same.

One object of my present invention is to provide an efficient method of extracting vanadium free from other metals from ore or other material containing the same.

A further object is to provide a method whereby all vanadium-bearing ores can be treated with high extraction efficiency, irrespective of how the vanadium values are present, either as vanadate, sulfid, oxid, or as salt in combination with any acid.

With these objects in view the invention consists in certain novel steps in the method for the extraction of vanadium, as hereinafter set forth and pointed out in the claims.

My improved method is carried out substantially as follows: The ore is ground to about 60–80 mesh and then treated with a suitable dissolving acid, mostly dilute sulfuric acid, 1:1, in a suitable vessel and the mass heated and agitated by steam. The solution thus obtained, containing all the vanadium and other soluble metals originally present in the ore, is decanted into a settling tank and thus separated from the insoluble gangue material. The solution, after settling, is pumped into a precipitating tank where it is boiled with steam and a calculated quantity of a strong oxidizing agent is added to it, causing precipitation of all the vanadium in the form of a hydrated red oxid. As oxidizing precipitating agents I employ an oxy-acid compound of chlorin, such as sodium or potassium chlorate. Also gaseous oxidizers can be used; for instance, the gas obtained by the action of hydrochloric acid on potassium or sodium chlorate and generated in a separate vessel and passed through the solution. The precipitation can be effected in the solution with a large excess of free acid or after neutralizing it with an alkali. The precipitate consisting of practically pure hydrated vanadic acid is separated from the supernatant liquid by filtration or decantation and washed to free it from the same. The washed precipitate is then dried at a temperature sufficiently high to eliminate all hydrate water, thus leaving a product consisting of practically pure $V_2O_5$ which may be reduced to the metal by any of the ordinarily known processes of reduction. The supernatant liquid after removal of the hydrated precipitate can be re-used to partly extract fresh ore in the first stage of the operation. The oxidizing agent present in this liquor, for instance chlorin, is especially beneficial in the case of extracting sulfureted ores where it helps to oxidize the sulfids, converting them into sulfates and thus bringing them more readily into solution. The liquor can thus be used over and over again for a number of times until it gets saturated with salts of the other metallic constituents of the ore, when it may be used to recover these constituents as by-products.

Having fully described my invention what I claim as new and desire to secure by Letters-Patent, is:

1. A method of extracting vanadium from ore, consisting in dissolving the soluble constituents of the ore, and then subjecting the solution to an oxidizing agent to precipitate the vanadium, free from all other metals.

2. A method for recovering vanadium from material containing the same, consisting in dissolving the soluble constituents of said material, and then subjecting said solution to the action of an oxidizing agent to precipitate the vanadium, free from all other metals.

3. A method for extracting vanadium from ores, which consists in subjecting the ore to the action of an acid to dissolve the soluble constituents and precipitating the vanadium free from all other metals out of this strongly acid solution by means of an oxidizing agent.

4. A method of extracting vanadium from ores, which consists in subjecting the ore to the action of a dissolving acid, neutralizing the resultant solution, and then precipitating the vanadium free from all other metals contained in the solution, with an oxidizing agent.

5. A method for extracting vanadium from ores, which consists in dissolving the soluble constituents of the ore, treating the solution thus made, with an oxy-acid compound of chlorin to precipitate the vanadium free from all other metals contained in said solution.

6. A method for extracting vanadium from ores, which consists in subjecting the ore to the action of an acid to dissolve the soluble constituents and precipitating the vanadium free from all other metals by passing through the solution an oxidizing gas.

In testimony whereof, I have signed this specification in the presence of two subscribing witnesses.

BYRAMJI D. SAKLATWALLA.

Witnesses:
JAMES C. GRAY,
JAS. A. FLANNERY.